United States Patent [19]
Ong

[11] Patent Number: 5,453,101
[45] Date of Patent: Sep. 26, 1995

[54] PROCESS FOR PRODUCING COMPOSITE ACTIVE ELECTROLYTE-MATRIX AND LAMINATED COMPONENT TAPES FOR MOLTEN CARBONATE FUEL CELLS

[75] Inventor: Estela T. Ong, Chicago, Ill.

[73] Assignee: Institute of Gas Technology, Des Plaines, Ill.

[21] Appl. No.: 18,019

[22] Filed: Feb. 16, 1993

Related U.S. Application Data

[63] Continuation-in-part of Ser. No. 685,688, Apr. 16, 1991, abandoned.

[51] Int. Cl.$^6$ ........................................................ H01M 8/02
[52] U.S. Cl. ......................... 29/623.5; 29/623.1; 429/41; 429/46; 429/127
[58] Field of Search ........................ 429/46, 41, 16, 429/12, 127; 29/623.5, 623.1

[56] References Cited

U.S. PATENT DOCUMENTS

| | | |
|---|---|---|
| 3,622,394 | 11/1971 | Bawa et al. . |
| 4,009,321 | 2/1977 | Baker et al. . |
| 4,079,171 | 3/1978 | Marianowski et al. . |
| 4,115,632 | 9/1978 | Kinoshita et al. . |
| 4,216,278 | 8/1980 | Arendt et al. . |
| 4,297,419 | 10/1981 | Nickols, Jr. et al. . |
| 4,329,403 | 5/1982 | Baker . |
| 4,389,467 | 7/1983 | Singh et al. . |
| 4,478,776 | 10/1984 | Maricle et al. . |
| 4,526,812 | 7/1985 | Iacovangelo et al. . |
| 4,526,845 | 7/1985 | Reiser et al. . |
| 4,538,348 | 9/1985 | Vine et al. . |
| 4,542,079 | 9/1985 | Takeuchi et al. . |
| 4,555,453 | 11/1985 | Appleby . |
| 4,663,250 | 5/1987 | Ong et al. . |
| 5,240,786 | 8/1993 | Ong et al. . |

*Primary Examiner*—John S. Maples
*Attorney, Agent, or Firm*—Speckman, Pauley & Fejer

[57] ABSTRACT

A composite active electrolyte-matrix tape, single laminated active electrolyte-matrix tapes laminate, single electrolyte matrix/cathode tapes laminate, and single composite active electrolyte-matrix/cathode tapes laminate, all in the form of a single flexible sheet for use as fuel cells components, and process for producing same in situ. These components reduce the number of components necessarily handled in fuel cell assembly. The composite active electrolyte-matrix tape provides a major portion or all of the active electrolyte required by the entire cell for operation. The electrolyte matrix/cathode tapes laminate provides a supported electrolyte matrix structure resistant to cracking and fracture. Active electrolyte may also be added to either the electrolyte matrix, to the cathode, or to both tapes in the electrolyte matrix/cathode laminate to provide a major portion or all of the active electrolyte for cell operation. The invention is suited for molten alkali metal carbonates fuel cells.

27 Claims, No Drawings

PROCESS FOR PRODUCING COMPOSITE ACTIVE ELECTROLYTE-MATRIX AND LAMINATED COMPONENT TAPES FOR MOLTEN CARBONATE FUEL CELLS

This application is a continuation-in-part application of Ser. No. 07/685,688, filed Apr. 16, 1991, now abandoned.

BACKGROUND OF THE INVENTION

1. Field of the Invention

This invention relates to molten carbonate fuel cells and their component structure and assembly. The invention simplifies the assembly of components and start-up procedure for molten carbonate fuel cells and stacks produced by the tape casting method by reducing the number of components required for assembly and greatly reducing or eliminating the requirement of loading active electrolyte into the electrolyte matrix.

2. Description of Related Art

Presently, fuel cells produced by the tape casting method are assembled with an anode, a cathode, two or more layers of electrolyte matrix tapes and a source(s) of active electrolyte for the matrix and electrodes. The tapes contain organic binders which are burned off as the assembled cell is heated to its operating temperature of typically about 600° to 750° C. After the binders are removed, the alkali metal carbonates electrolyte is melted and impregnates the cell components. Another method of fuel cell electrolyte production is hot pressing of mixed powders of electrolyte matrix and active electrolyte. However, high pressures are necessary and commercially practical sizes of electrolytes for molten carbonate fuel cells cannot be produced by hot pressing. To achieve commercial practicability of molten carbonate fuel cells, the electrolyte must be very thin, on the order of 10 to 70 mils, to provide sufficiently low IR drop, be stable under the broad range of thermal cycle necessary upon cell shut-down and start-up, be capable of maintaining gas integrity under these different conditions, and be practical to produce. In addition, the electrolyte structure comprising carbonate electrolyte and $LiAlO_2$ support particles should have as low an empty porosity as possible.

U.S. Pat. No. 4,555,453 teaches electrophoretic deposition of electrolyte matrix, with or without active electrolyte material, from a dielectric vehicle upon the surface of a fuel cell electrode. The '453 patent teaches the electrolyte matrix may be electrophoretically applied to one electrode and active electrolyte impregnated into the matrix or the active electrolyte may be impregnated into the electrolyte matrix powder and both simultaneously electrophoretically deposited onto the electrode. The '453 patent teaches thicknesses of less than 500 microns are possible since the electrolyte is mechanically supported on the fuel cell electrode. U.S. Pat. No. 4,329,403 teaches deposition of electrolyte material on electrodes wherein the electrolyte matrix has a varying composition, the sides towards the electrodes having coefficients of expansion nearer to that of the adjacent electrode.

U.S. Pat. No. 4,538,348 teaches electrolyte matrix tapes for molten carbonate fuel cells which tapes are produced by casting a mixture of inert particles less than 1 micron in size to produce fine pores, corrosion resistant ceramic particles having an average size greater than 25 microns for crack attenuation, and a plastic binder which is volatilized from the cast tape. The fuel cell is then assembled and active electrolyte contained in a prefilled porous anode is wicked into the electrolyte matrix upon heating to fuel cell operating temperature.

U.S. Pat. No. 4,216,278 teaches fabrication of fuel cell electrolyte matrix blanks by molding, pressing or tape casting followed by impregnating the electrolyte matrix blank through contact of molten active electrolyte with one surface of the blank under furnace conditions.

U.S. Pat. No. 4,526,812 teaches an electrolyte carbonates coated ceramic powder for preparing electrolyte porous tapes for use in molten carbonate fuel cells. The ceramic particles are entirely coated with 5 to 30 volume percent electrolyte carbonates which does not significantly change the size of the ceramic particle. The '812 patent teaches the necessity of adding electrolyte carbonates to the cell to fill the porosity. Molten carbonates fuel cells tested according to the '812 patent showed peak performance of about 0.725 to 0.775 volts at 160 $ma/cm^2$ and 650° C.

U.S. Pat. No. 4,009,321 teaches electrolytes for molten carbonate fuel cells wherein the inert electrolyte carrier material is substantially pure alkali metal aluminate; U.S. Pat. No. 4,079,171 teaches lithium aluminate support matrix having specific crystalline structure for molten carbonate fuel cell electrolytes; U.S. Pat. No. 4,115,632 teaches a method of preparation of fuel cell electrolytes of rod-shaped lithium aluminate particles; and U.S. Pat. No. 4,663,250 teaches addition of an electrode dissolution reduction agent to an electrolyte for use in a molten carbonate fuel cell.

SUMMARY OF THE INVENTION

It is an object of this invention to provide composite active electrolyte-matrix tapes and laminates of a plurality of such tapes for use in fuel cells wherein the active electrolyte in the composite tape serves as the source for most or all of the electrolyte required by the cell package. This enables production of fuel cells without the requirement of further loading with active electrolyte after assembly of a unit cell. Cell assembly requires only three components: an anode tape, a composite active electrolyte-matrix tapes laminate, and a cathode tape.

It is another object of this invention to provide single electrolyte matrix/cathode tapes laminate and single composite active electrolyte-matrix/cathode tapes laminate whereby the electrolyte matrix is mechanically supported by the cathode, reducing cracking and fracture. The composite active electrolyte-matrix/cathode tapes laminate may be used in the green state in the fuel cell or pre-sintered to a binder free and strong laminate. This enables assembly of fuel cells from two components, an anode tape and a single electrolyte matrix/cathode tapes laminate or a single composite active electrolyte-matrix/cathode tapes laminate, as compared with prior requirements for use of at least four separate tapes in fuel cell assembly.

It is yet a further object of this invention to provide composite active electrolyte-matrix tapes and laminates of a plurality of such tapes and/or composite active electrolyte-matrix/cathode tapes laminate which are produced in situ in fuel cells.

These and other objects and advantages are achieved by a process for assembly of a composite active electrolyte-matrix tape in situ in a fuel cell in which a single composite active electrolyte-matrix tape about 45 to about 85 volume percent active electrolyte distributed within and upon about 15 to about 55 volume percent matrix particles and having about 30 to about 70 volume percent active electrolyte and matrix and about 30 to about 70 volume percent void space is placed into a fuel cell, a compacting force is applied to said fuel cell, and said fuel cell is heated to a temperature between about 550° C. and about 750° C., forming a single composite active electrolyte-matrix tape having about 45 to about 85 volume percent said active electrolyte distributed within and upon about 15 to about 55 volume percent said matrix particles and having about 30 to about 70 volume percent said active electrolyte and said matrix and having about 0 to about 20 volume percent void space.

The composite active electrolyte-matrix tapes produced in accordance with the process of this invention are particularly useful in molten carbonate fuel cells wherein the matrix comprises lithium aluminate and the active electrolyte comprises lithium carbonate and at least one carbonate selected from the group consisting of potassium carbonate and sodium carbonate, the active electrolyte in the composite active electrolyte-matrix tape being sufficient to provide a major portion or all of the active electrolyte for the fuel cell operation. By the terminology a "major portion" is meant over about 60 percent, and preferably over about 80 percent, of the active electrolyte for fuel cell operation.

In accordance with one embodiment of this invention, a plurality of such composite active electrolyte-matrix tapes are laminated together to form a single composite active electrolyte-matrix tapes laminate in the form of a single flexible sheet of the thickness desired for the active electrolyte-matrix portion of the fuel cell.

In accordance with another embodiment of this invention, an electrolyte matrix/cathode tapes laminate or a composite active electrolyte-matrix/cathode tapes laminate is provided to form a single tapes laminate. In this embodiment, the handling of only two components is necessary for cell assembly: the electrolyte matrix/cathode tapes laminate or the active electrolyte-matrix/cathode tapes laminate and the anode. Further, the cathode in these laminates serves as a mechanical support to the matrix to prevent cracking or fracturing during cell start-up. In the case of the electrolyte matrix/cathode laminate, active electrolyte carbonates may be added to either the matrix layer, the cathode layer, or both layers to provide a major portion or all of the active electrolyte needed for the cell package.

One embodiment of the process for assembly of fuel cells according to this invention comprises placing an anode tape adjacent one side of at least one composite active electrolyte-matrix tape as described above and placing a cathode tape adjacent the opposite side of the composite active electrolyte-matrix tape(s). In a preferred embodiment, a plurality of composite active electrolyte-matrix tapes forming a single composite active electrolyte-matrix tapes laminate in the form of a single flexible sheet is used. The process is particularly useful in production of molten carbonates fuel cells wherein the active electrolyte is a mixture of lithium carbonate and at least one of potassium carbonate and sodium carbonate present in an amount sufficient to provide most or all of the active electrolyte for fuel cell operation and the electrolyte matrix comprises lithium aluminate.

Another embodiment of the process of this invention comprises placing an anode tape adjacent one side of a single electrolyte matrix/cathode tapes laminate or a composite active electrolyte-matrix/cathode tapes laminate. This embodiment involves handling only two components in fuel cell assembly and is also especially useful in assembly of molten carbonates fuel cells. When the electrolyte matrix/ cathode tapes laminate is used, active electrolyte may be provided to the electrolyte matrix, to the cathode, or to both.

The electrolyte matrix/cathode tapes laminate may be formed by tape casting a cathode tape directly over an active electrolyte-free electrolyte matrix tape and may be used in the fuel cell in the green form or may be sintered. A cathode tape may also be cast directly over a composite active electrolyte-matrix tape or its laminate.

The process for production of composite active electrolyte-matrix tapes for use in fuel cells in accordance with one embodiment of this invention further comprises mixing powders of active electrolyte material and high surface area matrix material; heating the mixture to above the melting point of the active electrolyte material forming composite active electrolyte-matrix; cooling and grinding the composite active electrolyte-matrix to a fine powder; if necessary repeating the heating, cooling and grinding to further homogenize the mixture; dispersing and milling the composite active electrolyte-matrix fine powder in a liquid with binder suitable for tape casting; degassing the dispersion of the composite active electrolyte-matrix fine powder in the liquid with binder; casting the degassed dispersion of the composite active electrolyte-matrix fine powder in liquid into a tape; and evaporating the liquid to form a dry, flexible composite active electrolyte-matrix tape. A plurality of these tapes may be laminated together to form a single laminated active electrolyte-matrix tapes laminate of a suitable thickness for the desired fuel cell active electrolyte-matrix. Lamination may be achieved by rolling or pressing together multiple tapes or by multiple layer tape casting.

DESCRIPTION OF PREFERRED EMBODIMENTS

Assembly of fuel cells using cast tape components is known in the art. This invention provides an improvement to the assembly of fuel cells using cast tape components by providing a composite active electrolyte-matrix tape which allows assembly of a fuel cell with three component parts; a cathode tape, a composite active electrolyte-matrix tape or a plurality of such tapes formed into a single active electrolyte-matrix tapes laminate, and an anode tape. A further embodiment of this invention provides a single electrolyte matrix/cathode laminate or a single composite active electrolyte-matrix/cathode tapes laminate which allows assembly of a fuel cell with two component parts; a single electrolyte matrix/cathode laminate or a composite active electrolyte-matrix/cathode tapes laminate and an anode tape. The fewer components in each unit cell becomes especially important in the assembly of fuel cell stacks containing many unit cells, especially when considering the large surface area necessary for commercial sized fuel cell stacks. The fewer cell components are also important in fuel cell start-up procedures involving large thermal variations. Further, the composite active electrolyte-matrix tape and single active electrolyte-matrix tapes laminate may contain a major portion or all of the active electrolyte needed for cell operation thereby providing a source for the required loading of active electrolyte during cell start-up.

The composite active electrolyte-matrix tape comprises about 45 to about 85 volume percent active electrolyte distributed within and upon about 15 to about 55 volume percent matrix particles which form about 30 to about 70 volume percent of the active electrolyte-matrix tape, the remainder being substantially void space. By use of the term substantially, it is meant that the composite active electrolyte-matrix tape may also contain much smaller amounts of reinforcing material or any other components found useful to cell operation. A preferred amount of active electrolyte is about 50 to about 80 volume percent of the active electrolyte-matrix solid mixture. Electrolyte content depends upon target matrix thickness, carbonates retention of the matrix, the cathode, and the anode, and fabricability of the carbonates/matrix powder. Suitable active electrolytes for use in molten alkali metal carbonates fuel cells are binary and ternary compositions of carbonates, namely lithium carbonate, potassium carbonate, and sodium carbonate. It is preferred that lithium carbonate be the major component of the active electrolyte. Suitable carbonates compositions for use in molten carbonate fuel cells are well known in the art. Although any high surface area support material may be used for the matrix portion of the composite active electrolyte-matrix tape, it is preferred for use in molten carbonates fuel cells that the major portion of the matrix be lithium aluminate. The tape is formed by tape casting, more fully described below, and the dry tape is a flexible sheet about 10 mils to about 50 mils thick, preferably about 15 mils to about 30 mils thick. A plurality of the composite active electrolyte-matrix tapes may be laminated together to form a single active electrolyte-matrix tapes laminate of desired thickness for the electrolyte component of the unit cell, generally about 20 mils to about 150 mils thick, preferably about 30 mils to about 100 mils thick.

The composite active electrolyte-matrix tape can be produced by mixing matrix chemical powder having a high surface area of about 5 to about 20 $M^2$/gm with powders of the active electrolyte chemicals of about −100 to about −325 mesh in the desired proportions. Thorough mixing of the matrix chemical and active electrolyte chemical powders may be achieved by milling in a conventional ball mill, a vibratory ball mill or a stirred ball mill for a time sufficient to obtain thorough mixing. The milled powder is then heated to above the melting point of the active electrolyte chemicals and maintained at that temperature for about 2 to about 10 hours to allow the molten active electrolyte material to distribute itself within pores and upon the surface of the matrix powder which upon cooling forms aggregates of matrix powder cemented together by active electrolyte. When lithium aluminate matrix and a 55 weight percent lithium carbonate and 45 weight percent potassium carbonate active electrolyte is desired, it is suitable to maintain the heat at about 650° C. for at least 2 hours. The cooled fired composite of active electrolyte and matrix is then ground and sieved to a size suitable for tape casting, such as a powder of −80 mesh. The milling, heating, melting, cooling and powder grinding operations are repeated for a second time. I have found that the heating to above the melting point of the active electrolyte is an essential step in the process of this invention to obtain a uniform electrolyte distribution in the matrix.

The fine powder composite active electrolyte-matrix is dispersed into a liquid comprising an organic vehicle, a plastic binder and additives to render desired tape characteristics. Suitable organic vehicles include chlorinated hydrocarbons and alcohol. Suitable plastic binders provide handleability, flexibility and conformability to the tape. Any polymer which decomposes at temperatures lower than fuel cell operating temperatures may be used. Various plasticizers and modifiers such as flow control agents may be added for application purposes. An important step in the process of this invention is milling the dispersion to obtain a very fine particulate dispersion having particle sizes of about 0.1 to about 1.0 microns. This can be achieved by vibratory milling for about 60 minutes or by attrition milling to achieve even finer particle sizes. The dispersion is degassed under vacuum.

The degassed slurry is cast into a tape by conventional methods, such as applied to a releasable surface, such as a Teflon coated plate, and spread with a doctor blade. The tape is dried by evaporation of the organic vehicle to form a dry, flexible sheet composite active electrolyte-matrix tape having a thickness of about 10 to about 50 mils, preferably about 15 mils to about 45 mils.

To obtain the desired electrolyte thickness in the fuel cell, a plurality of composite active electrolyte-matrix tapes may be laminated together to form a single active electrolyte-matrix tapes laminate in the form of a single flexible sheet about 20 mils to about 150 mils, preferably about 30 mils to about 100 mils in thickness. The laminate of composite active electrolyte-matrix tapes may be produced by stacking a plurality of individual composite active electrolyte-matrix tapes and applying a pressure of about 1,000 to about 10,000 psi through a hydraulic press or through rollers to form a laminate of the desired thickness or by multilayer tape casting, as known in the art, to build up the desired thickness. The active electrolyte-matrix tapes laminate may also be formed by multi-layer tape casting where one tape is cast over the other.

The microstructure of the tapes is a random packing of very fine composite active electrolyte-matrix particles with unfilled porosity between them. The porosity of the composite active electrolyte-matrix tape or their laminated assembly, must be taken into account in obtaining the desired thickness of the electrolyte. Generally the porosity will be in the order of about 30 to about 70 volume percent. This porosity is substantially eliminated as the tape is heated and a compaction force applied to the fuel cell when the fuel cell temperature is raised to operating temperature. First the organic binder is removed, followed by consolidation of the unfilled porosity as the active electrolyte softens, and finally, melting of the active electrolyte and final consolidation of the matrix. In tests in laboratory molten carbonates fuel cells, it has been found that the decrease in thickness of the electrolyte component has been very close to that predicted on the basis of unfilled porosity.

The number of cell components to be handled during cell assembly can also be reduced by a single electrolyte matrix/cathode laminate or a composite active electrolyte-matrix/cathode tapes laminate having at least one composite active electrolyte-matrix tape adjacent one side of at least one cathode tape to form the single tapes laminate. For use in molten carbonates fuel cells, it is preferred that the cathode metal comprise nickel. Cathode tapes may be formed directly over a electrolyte matrix tape or single or composite active electrolyte-matrix tapes laminate. A dispersion of fine powder of carbonyl nickel INCO Type 255 or Type 123, is formed in a liquid vehicle comprising binder and other additives as described for the electrolyte tape casting, and cast directly over a dry electrolyte matrix tape or composite active electrolyte-matrix or laminate thereof tape using a doctor blade. Alternatively, a matrix tape may be cast over a cathode tape or a matrix tape and a cathode tape may be simultaneously cast one over the other by multilayer tape casting techniques.

The cathode tape may also contain active electrolyte to supplement active electrolyte in the composite active electrolyte-matrix tape or tapes laminate, or may contain sufficient active electrolyte for cell operation and a cathode-active electrolyte tape used adjacent a electrolyte matrix tape or tapes laminate to obviate the necessity of loading active electrolyte into the fuel cell assembly.

The electrolyte matrix portion of the electrolyte matrix/cathode tapes laminate comprises about 20 to about 60 volume percent matrix particles and about 40 to about 80 volume percent void space. The electrolyte matrix/cathode tapes laminate and the composite active electrolyte-matrix/cathode tapes laminate are about 10 to about 80 mils thick. For use in molten alkali metal carbonates fuel cells, it is preferred that the cathode portion of the cathode tapes laminates comprises nickel.

The preferred electrolyte structure of a molten carbonate fuel cell has as low an empty porosity as possible, preferably less than 5%. We have discovered that the void volume present in known electrolyte structures having 30–50% void volume can be substantially eliminated at a temperature and under loads typically applied to a fuel cell. Thus, the composite active electrolyte-matrix tape of this invention can be produced in situ in a fuel cell where the organic binder is removed as the fuel cell is heated and the void volume eliminated under the holding force of the fuel cell upon reaching the fuel cell operating temperature of 600° C. to 750° C. For example, a known composite active electrolyte-matrix tape is normally cast to a thickness of 10–30 mils and has a void volume of about 50%. The desired electrolyte-matrix structure has a thickness of about 20–60 mils with less than about 5% void volume. If, using the tape having a 50% void volume, it is desired to obtain an electrolyte-matrix structure having a thickness of about 40 mils, then multiple layers of tapes having a total thickness of 80 mils would be used, compaction resulting in substantial elimination of the void volume in the electrolyte-matrix structure and forming an electrolyte-matrix structure having a thickness of about 40 mils. However, in a fuel cell, the electrolyte-matrix structure is in contact with the electrodes which wick electrolyte from the structure. As a result, one obtains an electrolyte-matrix structure thinner than 40 mils and more porous than desired unless the electrolyte wicked by the electrodes is made up.

The electrolyte wicked by the electrodes is compensated for by using an electrolyte to matrix ratio higher than what the matrix can hold as an electrolyte structure. The electrolyte holding capacity of the matrix depends on its surface area and is about 60–70 volume percent for an electrolyte structure comprising a matrix having a surface area of about 10 $m^2/gm$. Thus, the electrolyte-to-matrix ratio of a tape in accordance with this invention is 70 to 30 or higher.

I have determined that the compaction behavior of composite active electrolyte/matrix tapes in accordance with this invention is such as to form functional electrolyte structures in situ. The test assembly consisted of a stack of composite active electrolyte/matrix tapes sandwiched between two cathodes. The use of two cathodes, instead of an anode and a cathode, simplifies the procedure while still providing wicking electrodes on both side of the composite active electrolyte tape. The components were circular, 3-cm diameter disks. The stack of components was placed between two mechanically supported dense ceramic disks in a furnace and then loaded with 15 psi pressure and heated to 650° C., the normal cell operating temperature. A displacement meter was used to measure the compaction of the component assembly.

Two tape compositions were tested: 70% carbonate/30% $LiAlO_2$ and 75% carbonate/25% $LiAlO_2$. The 70% carbonate/30% $LiAlo_2$ tape had a total thickness of 332 mils and a void volume of about 50%. Although too large for an electrolyte structure, the thickness was, nevertheless, appropriate for determining compaction with good accuracy. The 75% carbonate/25% $LiAlO_2$ tape had a total thickness of 235 mils and a void volume of 46%. The 70% carbonate/30% $LiAlO_2$ tape compacted by 150 mils or 45%. Because it had an initial void volume of 50%, the resulting electrolyte structure was not entirely free of voids. Although this tape did not fully compact in this test, it has been successfully used in a fuel cell after being pre-compacted to about a 35% void volume before fuel cell assembly. The 75% carbonate/25% $LiAlO_2$ tape compacted by 136 mils or 58%. Because it had a void volume of only 46%, it compacted enough to form a sufficiently low void electrolyte structure.

Possible extensions of the embodiments described include laminates of the matrix with or without the active electrolyte, with the anode alone, with an anode on one side and a cathode on the other side, with a bubble barrier, with a reinforcement structure, and with other components that may be useful in the fuel cell.

The following examples are set forth using specific materials and conditions to illustrate preferred embodiments of the invention and should not be considered as limiting the invention in any way.

EXAMPLE I

High surface area lithium aluminate (Foote HSA- 10), lithium carbonate and potassium carbonate were mixed in weight proportion of 100:97:78 and milled in a vibratory mill with alumina balls for 1 to 2 hours. The mixed milled powder was then fired in an alumina crucible at 650° C. for two hours. The fired composite of lithium aluminate and lithium and potassium carbonates was ground and sieved to –80 mesh. The milling, firing and grinding steps were repeated to ensure good carbonates/lithium aluminate homogeneity. The sieved composite carbonates-aluminate powder was dispersed in a binder solution containing an organic solvent, a plastic binder and additives to render desirable tape characteristics, and milled in a vibratory mill for 60 minutes to obtain a fine powder dispersion. After milling, the dispersion was degassed under vacuum and cast into a tape on a Teflon-coated glass plate using a doctor blade. The organic solvent was evaporated by allowing the tape to dry in ambient air to result in a flexible sheet tape of 70 volume percent carbonates and 30 volume percent lithium aluminate of about 25 mils thickness. Four pieces of the composite active electrolyte-matrix tapes were stacked and laminated under pressure of 10,000 psi to form a composite active electrolyte-matrix tapes laminate of a thickness of 89 mils. This composite active electrolyte-matrix tapes laminate was estimated to have about 35 percent unfilled porosity.

EXAMPLE II

The composite active electrolyte-matrix tapes laminate as produced in Example I was assembled into a 3 $cm^2$ laboratory fuel cell using a nickel cathode 30 mils thick and about 70 percent porous and a 90 percent nickel 10 percent chromium anode 30 mils thick and about 65 percent porous. The cell was heated from room temperature to the cell operation temperature of 650° C. over a period of 41 hours and operated for 1000 hours at which time cell operation was voluntarily stopped. The cell exhibited steady operation upon reaching 900 mV potential at 160 $mA/cm^2$ current density using a fuel gas of 75% hydrogen/25% $CO_2$ humidified at 60° C. and oxidant gas of 30% $CO_2$/70% air humidified at room temperature. The OCV was 1035 mV. At 160 $ma/cm^2$ current density, the cathode and anode polarizations were 40 mv each and the total IR was 60 mv. Following cell operation, measurement of the composite active electrolyte-matrix tapes laminate thickness showed a 36% reduction due to consolidation of unfilled porosity.

EXAMPLE III

A single-layer carbonates-free electrolyte matrix tape, 25 mils thick, was used as a base over which a cathode tape was cast. Carbonyl nickel powder, INCO Type 255, was dispersed in a binder solution by milling and cast into a tape over the matrix tape. The height of the doctor blade was adjusted to between 40–50 mils depending upon the slurry viscosity to produce a 30 mil thick dry cathode tape. The organic solvent was evaporated by drying for 2–3 hours in ambient air. The dried electrolyte matrix/cathode laminate can be directly assembled in a fuel cell where the organic binder is burned off upon heating the fuel cell to operating temperature. This example demonstrates forming of a electrolyte matrix/cathode laminate which does not contain active electrolyte. The process can be extended to form a laminate that contains active electrolyte carbonates in either the matrix or the cathode, or both.

EXAMPLE IV

A electrolyte matrix/cathode laminate as produced in Example III was processed into a strongly sintered structure. The laminate was placed on a dense alumina plate and heated in air and maintained at 300° to 350° C. for 1–2 hours followed-by cooling. The laminate was then placed in a muffle furnace and heated to 800° C. over a period of 4 hours and maintained at that temperature for 1 hour. The muffle atmosphere was 10% hydrogen/90% nitrogen. A flat, sintered electrolyte matrix/cathode laminate was obtained.

EXAMPLE V

A flat, sintered electrolyte matrix/cathode laminate obtained in accordance with Example IV was cut into a disk about 1⅛ inches in diameter for use in a laboratory molten carbonates fuel cell. The sintered electrolyte matrix/cathode laminate was assembled with a 90% nickel 10% chromium anode 0.76 inch in diameter. Sufficient powdered electrolyte of 70 weight percent lithium carbonate and 30 weight percent potassium carbonate was placed on the face of the anode adjacent and on top of the matrix to provide proper electrolyte carbonates distribution in the pores of the cell components. The cell performance at 650° C. and 160 mA/cm$^2$ current density was 888 mV cell potential, 51 mV total IR drop, 18 mV cathode polarization and 78 mV anode polarization. The OCV was 1035 mV. The gases used for cell operation were 75% $H_2$/25% $CO_2$ fuel humidified at 60° C. and 30% $CO_2$/70% air oxidant humidified at room temperature.

EXAMPLE VI

A cathode tape containing active electrolyte was cast over an electrolyte matrix tape not containing active electrolyte. The cathode slurry was a mixture of 20 weight percent lithium and potassium carbonates and 80 weight percent nickel powders in a binder solution to result in cathode-active electrolyte tapes having a volumetric composition of 8 percent nickel and 9 percent carbonates before consolidation. A compacting pressure of 5,000 to 10,000 psi is appropriate to obtain desired nickel packing of 20 to 25 percent for the cathode. In this manner, a single electrolyte matrix/cathode-active electrolyte tapes laminate can be fabricated for direct combination with an anode tape for production of a molten carbonates fuel cell.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

I claim:

1. A process for assembly of a composite active electrolyte-matrix tape in situ in a fuel cell comprising:

placing a single composite active electrolyte-matrix tape about 45 to about 85 volume percent active electrolyte distributed within and upon about 15 to about 55 volume percent matrix particles and having about 30 to about 70 volume percent active electrolyte and matrix and about 30 to about 70 volume percent void space into a fuel cell;

applying a compacting force to said fuel cell; and heating said fuel cell to a temperature between about 550° C. and about 750° C., forming a single composite active electrolyte-matrix tape having about 45 to about 85 volume percent said active electrolyte distributed within and upon about 15 to about 55 volume percent said matrix particles and having about 30 to about 70 volume percent said active electrolyte and said matrix and about 0 to about 20 volume percent void space.

2. A process in accordance with claim 1 wherein said active electrolyte comprises a mixture of lithium carbonate and at least one carbonate selected from the group consisting of potassium carbonate and sodium carbonate.

3. A process in accordance with claim 2 wherein said matrix comprises lithium aluminate.

4. A process in accordance with claim 3 wherein said tape in its dry form is a flexible sheet about 15 to about 50 mils in thickness.

5. A process in accordance with claim 1 wherein said matrix comprises lithium aluminate.

6. A process in accordance with claim 1 wherein said tape in its dry form is a flexible sheet about 15 to about 50 mils in thickness.

7. A process in accordance with claim 1 wherein said active electrolyte in said composite active electrolyte-matrix tape is sufficient to provide at least a major portion of the active electrolyte for fuel cell operation.

8. A process in accordance with claim 1 wherein said active electrolyte in said composite active electrolyte-matrix tape is sufficient to provide all of the active electrolyte for fuel cell operation.

9. A process in accordance with claim 1, wherein a plurality of said composite active electrolyte-matrix tapes are laminated together to form an active electrolyte-matrix tapes laminate in the form of a single flexible sheet about 20 mils to about 150 mils in thickness.

10. A process in accordance with claim 9, wherein said active electrolyte comprises a mixture of lithium carbonate and at least one carbonate selected from the group consisting of potassium carbonate and sodium carbonate.

11. A process in accordance with claim 10, wherein said matrix comprises lithium aluminate.

12. A process in accordance with claim 11, wherein said laminate is about. 30 mils to about 100 mils thick.

13. A process in accordance with claim 10 wherein said matrix comprises lithium aluminate.

14. A process in accordance with claim 10 wherein said active electrolyte in said laminate is sufficient to provide at least a major portion of the active electrolyte for fuel cell operation.

15. A process in accordance with claim 10 wherein said active electrolyte in said laminate is sufficient to provide all of the active electrolyte for fuel cell operation.

16. A process in accordance with claim 1, wherein said composite active electrolyte-matrix tape is laminated to at least one cathode tape to form a single electrolyte matrix/cathode tapes laminate.

17. A process in accordance with claim 16 wherein said cathode tape comprises nickel.

18. A process in accordance with claim 16 wherein said electrolyte matrix comprises lithium aluminate.

19. A process in accordance with claim 16 wherein said laminate is about 10 mils to about 80 mils thick.

20. A process in accordance with claim 16, wherein active electrolyte is disposed in said void space of at least one of the electrolyte matrix portion and the cathode portion of said laminate.

21. A process in accordance with claim 20 wherein said active electrolyte is a sufficient quantity to provide at least a major portion of the active electrolyte for fuel cell operation.

22. A process in accordance with claim 20 wherein said active electrolyte is a sufficient quantity to provide all of the active electrolyte for fuel cell operation.

23. A process in accordance with claim 19 wherein said active electrolyte comprises a mixture of lithium carbonate and at least one carbonate selected from the group consisting of potassium carbonate and sodium carbonate.

24. A process for assembly of fuel cells comprising:

placing an anode tape adjacent one side of at least one composite active electrolyte-matrix tape comprising about 45 to about 85 volume percent active electrolyte distributed within and upon about 15 to about 55 volume percent matrix particles, said tape comprising about 30 to about 70 volume percent said active electrolyte and said matrix and about 30 to about 70 volume percent void space and about 15 mils to about 50 mils in thickness;

placing a cathode tape adjacent the opposite side of said at least one composite active electrolyte-matrix tape;

applying a compaction force to said fuel cell; and heating said fuel cell to a temperature between about 550° C. and about 750° C., forming a composite active electrolyte-matrix tape having about 0 to about 20 volume percent void space.

25. A process for assembly of fuel cells in accordance with claim 24, wherein said at least one composite active electrolyte-matrix tape comprises a plurality of said tapes laminated together to form an active electrolyte-matrix tapes laminate in the form of a single flexible sheet about 20 mils to about 150 mils thickness.

26. A process for assembly of fuel cells in accordance with claim 24, wherein said active electrolyte comprises a mixture of lithium carbonate and at least one carbonate selected from the group consisting of potassium carbonate and sodium carbonate, said matrix comprises lithium aluminate, and said laminate is about 30 mils to about 100 mils thick.

27. A process for assembly of fuel cells in accordance with claim 26, wherein said active electrolyte in said active electrolyte-matrix tapes laminate is sufficient to provide all of the active electrolyte for said fuel cell operation.

* * * * *